(12) United States Patent
Venable et al.

(10) Patent No.: US 8,988,344 B2
(45) Date of Patent: Mar. 24, 2015

(54) USER INTERFACE NAVIGATION

(71) Applicants: Morgan Kolya Venable, San Francisco, CA (US); Bernard James Kerr, Sausalito, CA (US); Vaibhav Thukral, Kirkland, WA (US); David Nister, Bellevue, WA (US)

(72) Inventors: Morgan Kolya Venable, San Francisco, CA (US); Bernard James Kerr, Sausalito, CA (US); Vaibhav Thukral, Kirkland, WA (US); David Nister, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 13/927,045

(22) Filed: Jun. 25, 2013

(65) Prior Publication Data

US 2014/0375544 A1 Dec. 25, 2014

(51) Int. Cl.
*G09G 5/00* (2006.01)
*G06F 3/01* (2006.01)
*G02B 27/01* (2006.01)

(52) U.S. Cl.
CPC ............ *G06F 3/013* (2013.01); *G02B 27/0179* (2013.01)
USPC .................... 345/156; 345/7; 345/8; 345/158

(58) Field of Classification Search
CPC ......... G06F 3/012; G06F 3/013; G06F 3/017; G06F 3/0482; G06F 3/0484
USPC .......................................... 345/7–9, 156–166
See application file for complete search history.

(56) References Cited

U.S. PATENT DOCUMENTS

| | | | |
|---|---|---|---|
| 5,731,805 A * | 3/1998 | Tognazzini et al. | 345/156 |
| 5,850,211 A | 12/1998 | Tognazzini | |
| 6,127,990 A * | 10/2000 | Zwern | 345/8 |
| 6,351,273 B1 | 2/2002 | Lemelson et al. | |
| 6,359,601 B1 * | 3/2002 | Maguire, Jr. | 345/7 |
| 6,421,064 B1 | 7/2002 | Lemelson et al. | |
| 6,603,491 B2 | 8/2003 | Lemelson et al. | |
| 6,886,137 B2 | 4/2005 | Peck et al. | |

(Continued)

FOREIGN PATENT DOCUMENTS

DE 102004027289 A1 12/2005

OTHER PUBLICATIONS

Roy, et al., "Visual Memory Augmentation: Using Eye Gaze as an Attention Filter", Retrieved at http://web.media.mit.edu/~dkroy/papers/pdf/roy_ghitza_2004.pdf, in Eighth International Symposium on Wearable Computers, Oct. 31, 2004, pp. 4.

(Continued)

*Primary Examiner* — Vijay Shankar
(74) *Attorney, Agent, or Firm* — Dave Ream; Jim Ross; Micky Minhas

(57) ABSTRACT

Embodiments that relate to navigating a hierarchy of visual elements are disclosed. In one embodiment a method includes presenting one or more visual elements from a two-dimensional plane via a display device. A home location within a viewable region of the display is established. A proportional size relationship between each element and each of the other elements is established. Using gaze tracking data, a gaze location at which a user is gazing within the viewable region is determined. The gaze location is mapped to a target location, and movement of the target location toward the home location is initiated. As the target location moves closer to the home location, each of the visual elements is progressively enlarged while the proportional size relationship between each of the visual elements and each of the other visual elements is also maintained.

20 Claims, 8 Drawing Sheets

(56) References Cited

U.S. PATENT DOCUMENTS

| | | |
|---|---|---|
| 2002/0105482 A1 | 8/2002 | Lemelson et al. |
| 2005/0188333 A1 | 8/2005 | Hunleth et al. |
| 2011/0175932 A1 | 7/2011 | Yu et al. |
| 2012/0146891 A1 | 6/2012 | Kalinli |
| 2013/0014052 A1 | 1/2013 | Frey et al. |

OTHER PUBLICATIONS

Kozma, et al., "GaZIR: Gaze-based Zooming Interface for Image Retrieval", Retrieved at http://www.lkozma.net/mlmi09gazir.pdf>>, In Proceedings of 11th Conference on Multimodal Interfaces and the Sixth Workshop on Machine Learning for Multimodal Interaction, Nov. 2, 2009, pp. 8.

De Oliveira Horta, Thiago Chaves, "Controlling File Systems with Gaze", Retrieved at http://tutkielmat.uta.fi/pdf/gradu05185.pdf>>, In M.Sc. Thesis—University of Tampere, Department of Computer Sciences, Jun. 2011, pp. 61.

Adams, et al., "The Inspection of Very Large Images by Eye-gaze Control", Retrieved at http://www.ee.ic.ac.uk/Mark/papers/Adams_etal_avi08.pdf, In Proceedings of the Working Conference on Advanced Visual Interfaces, May 28, 2008, pp. 8.

Talukder, et al., "Real-time Non-Intrusive Eyetracking and Gaze-point Determination for Human-Computer Interaction and Biomedicine", Retrieved at http://trs-new.jpl.nasa.gov/dspace/bitstream/2014/38027/1/04-0074.pdf, Retrieved Date: Feb. 5, 2013, pp. 9.

Ohno, Takehiko, "Features of Eye Gaze Interface for Selection Tasks", Retrieved at http://ieeexplore.ieee.org/stamp/stamp.jsp?tp=&arnumber=704190, In Proceedings of the Third Asian Pacific Computer and Human Interaction, Jul. 15, 1998, pp. 6.

ISA European Patent Office, International Search Report & Written Opinion for PCT/US2014/043305, WIPO, Sep. 4, 2014, 11 Pages.

\* cited by examiner

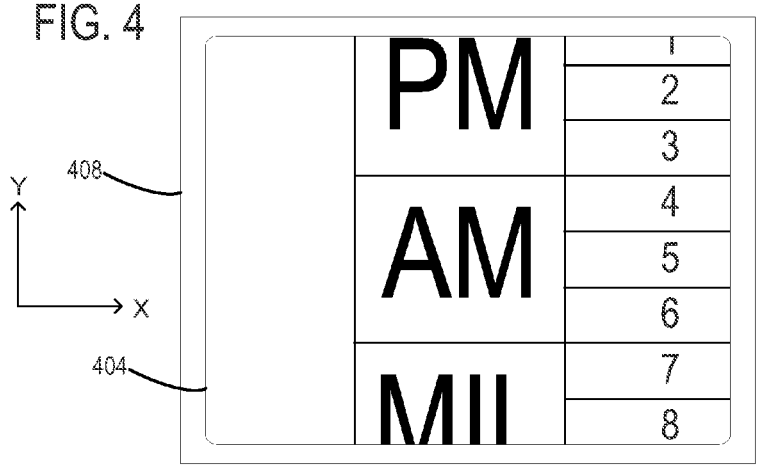
FIG. 4
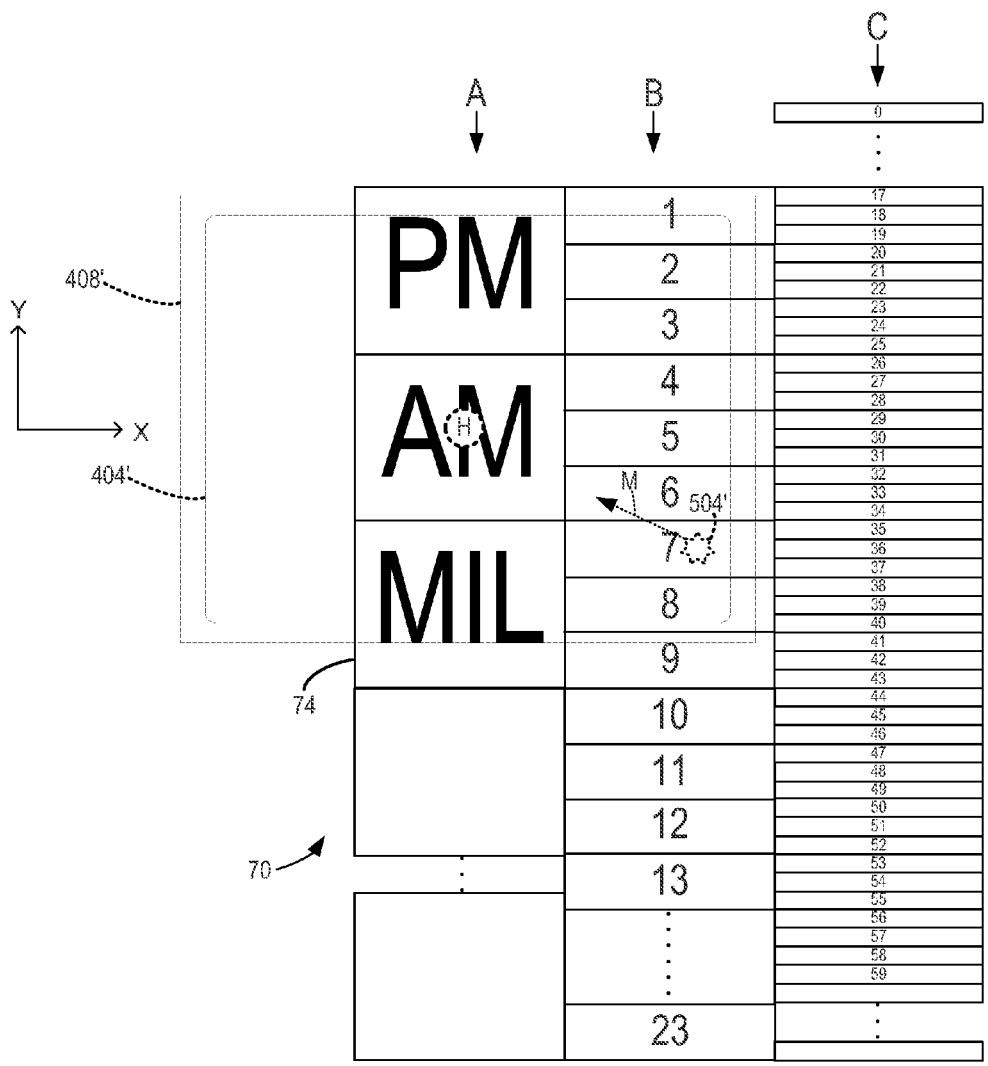

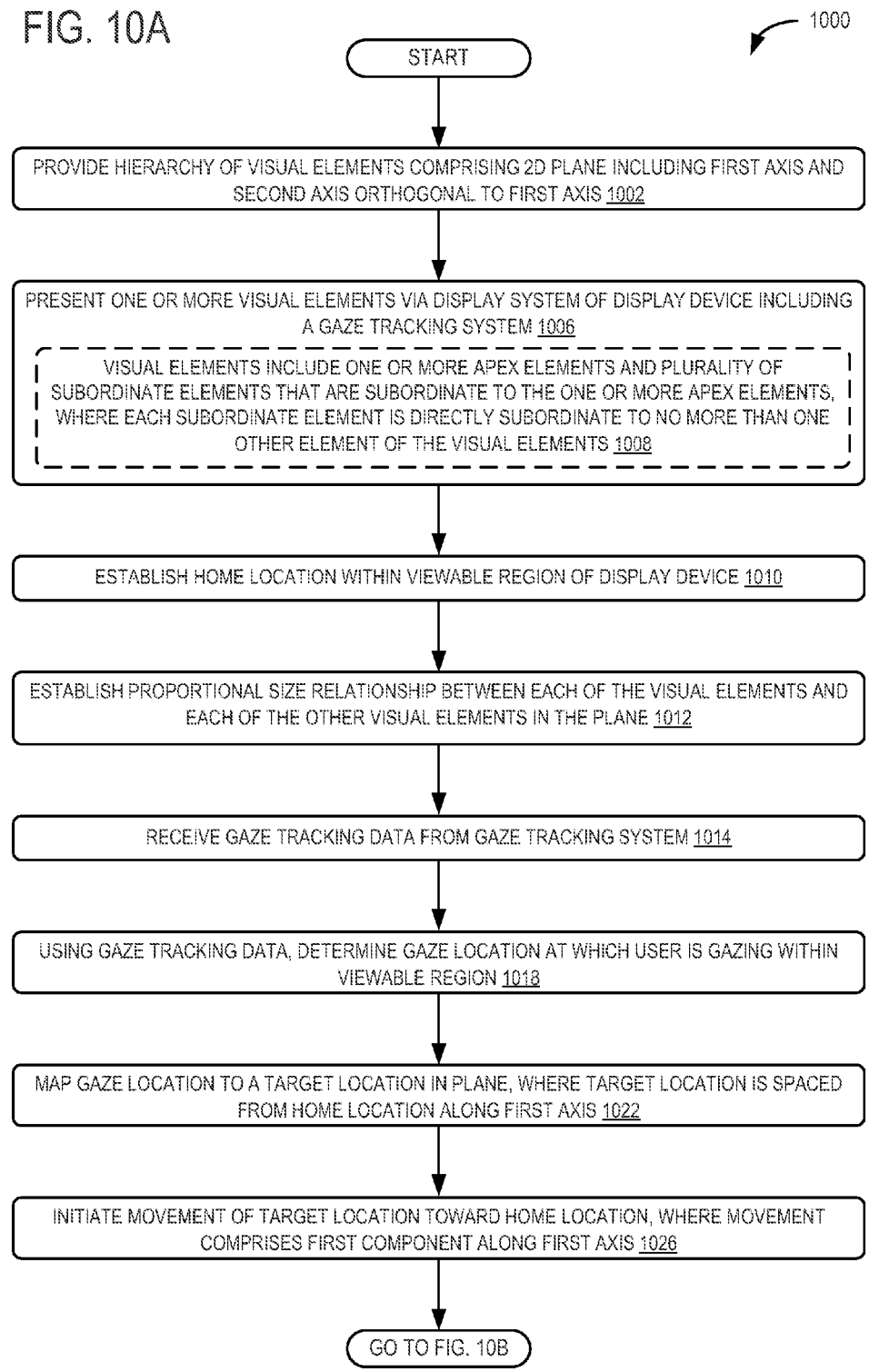

FIG. 10B

FROM FIG. 10A

AS TARGET LOCATION MOVES CLOSER TO HOME LOCATION ALONG FIRST AXIS, PROGRESSIVELY ENLARGE EACH OF THE VISUAL ELEMENTS VIEWABLE WITHIN VIEWABLE REGION WHILE ALSO MAINTAINING THE PROPORTIONAL SIZE RELATIONSHIP BETWEEN EACH OF THE VISUAL ELEMENTS AND EACH OF THE OTHER VISUAL ELEMENTS 1030

PROGRESSIVELY ENLARGE EACH OF THE VISUAL ELEMENTS AS THE TARGET LOCATION MOVES CLOSER TO THE HOME LOCATION IN A FIRST DIRECTION ALONG THE FIRST AXIS 1034

PROGRESSIVELY SHRINK EACH OF THE VISUAL ELEMENTS AS THE TARGET LOCATION MOVES CLOSER TO THE HOME LOCATION IN A SECOND DIRECTION OPPOSITE TO THE FIRST DIRECTION ALONG THE FIRST AXIS 1038

REFRAIN FROM INITIATING MOVEMENT OF TARGET LOCATION TOWARD HOME LOCATION WHEN TARGET LOCATION LIES WITHIN PAUSE REGION SURROUNDING HOME LOCATION 1042

PROPORTIONALLY DECREASE THE VELOCITY OF MOVEMENT OF THE TARGET LOCATION TOWARD THE HOME LOCATION AS DISTANCE OF TARGET LOCATION FROM HOME LOCATION DECREASES 1046

WHERE TARGET LOCATION IS ALSO SPACED FROM HOME LOCATION ALONG SECOND AXIS, AND MOVEMENT FURTHER COMPRISES A SECOND COMPONENT ALONG THE SECOND AXIS, REFRAIN FROM MODIFYING THE VISUAL ELEMENTS VIEWABLE VIA THE DISPLAY IN REALTION TO THE SECOND COMPONENT OF MOVEMENT OF THE TARGET LOCATION 1050

RECEIVE USER INPUT 1058

BASED ON USER INPUT, SELECT ONE OF THE VISUAL ELEMENTS THAT IS ASSOCIATED WITH TARGET LOCATION 1062

SELECT THE VISUAL ELEMENT THAT IS ASSOCIATED WITH TARGET LOCATION BASED ON THE USER INPUT ONLY WHEN THE TARGET LOCATION LIES WITHIN PAUSE REGION SURROUNDING THE HOME LOCATION 1066

END

USER INTERFACE NAVIGATION

BACKGROUND

Navigating electronic content to search and select relevant portions of the content is a common task. In many examples, content is displayed to a user via a display associated with a computing device. For larger collections of content, the full range and extent of the content may not be viewable at one time within the limited space of the user's display. In these examples, a user typically navigates the content by scrolling or panning to reveal new content. In some examples, eye-tracking techniques may be utilized to monitor the location of a user's gaze relative to a display, and to use such gaze location to move or scroll content.

However, typical eye-tracking interfaces may fail to provide an intuitive and pleasing user experience when navigating content via a display. In particular, when the content includes an extensive hierarchy of information, such eye-tracking interfaces are typically incapable of providing an acceptable user experience for navigating the full range and extent of the hierarchy of information. This shortcoming may be particularly evident where the display is of limited size, such as with a smartphone.

SUMMARY

Various embodiments are disclosed herein that relate to systems and methods for navigating a hierarchy of visual elements. For example, one disclosed embodiment provides a method for navigating a hierarchy of visual elements, where the hierarchy comprises a two-dimensional plane including a first axis and a second axis orthogonal to the first axis. The method includes presenting one or more of the visual elements via a display system of a display device that includes a gaze tracking system, the display device being operatively connected to a computing device.

A home location is established within a viewable region of the display device. A proportional size relationship between each of the visual elements and each of the other visual elements in the plane is also established. The method includes receiving gaze tracking data from the gaze tracking system and, using the gaze tracking data, determining a gaze location at which the user is gazing within the viewable region. The method further includes mapping the gaze location to a target location in the two-dimensional plane, where the target location is spaced from the home location along the first axis.

The method includes initiating movement of the target location toward the home location, where the movement comprises a first component along the first axis. As the target location moves closer to the home location along the first axis, the method includes progressively enlarging each of the visual elements that are viewable within the viewable region while also maintaining the proportional size relationship between each of the visual elements and each of the other visual elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a schematic view of a viewable region of a display device that is displaying a portion of visual elements from a two-dimensional plane, and a corresponding schematic view of the hierarchy of visual elements disposed in the two-dimensional plane.

FIGS. 10A and 10B are a flow chart of a method for navigating a hierarchy of visual elements according to an embodiment of the present disclosure.

DETAILED DESCRIPTION

Figure 1:
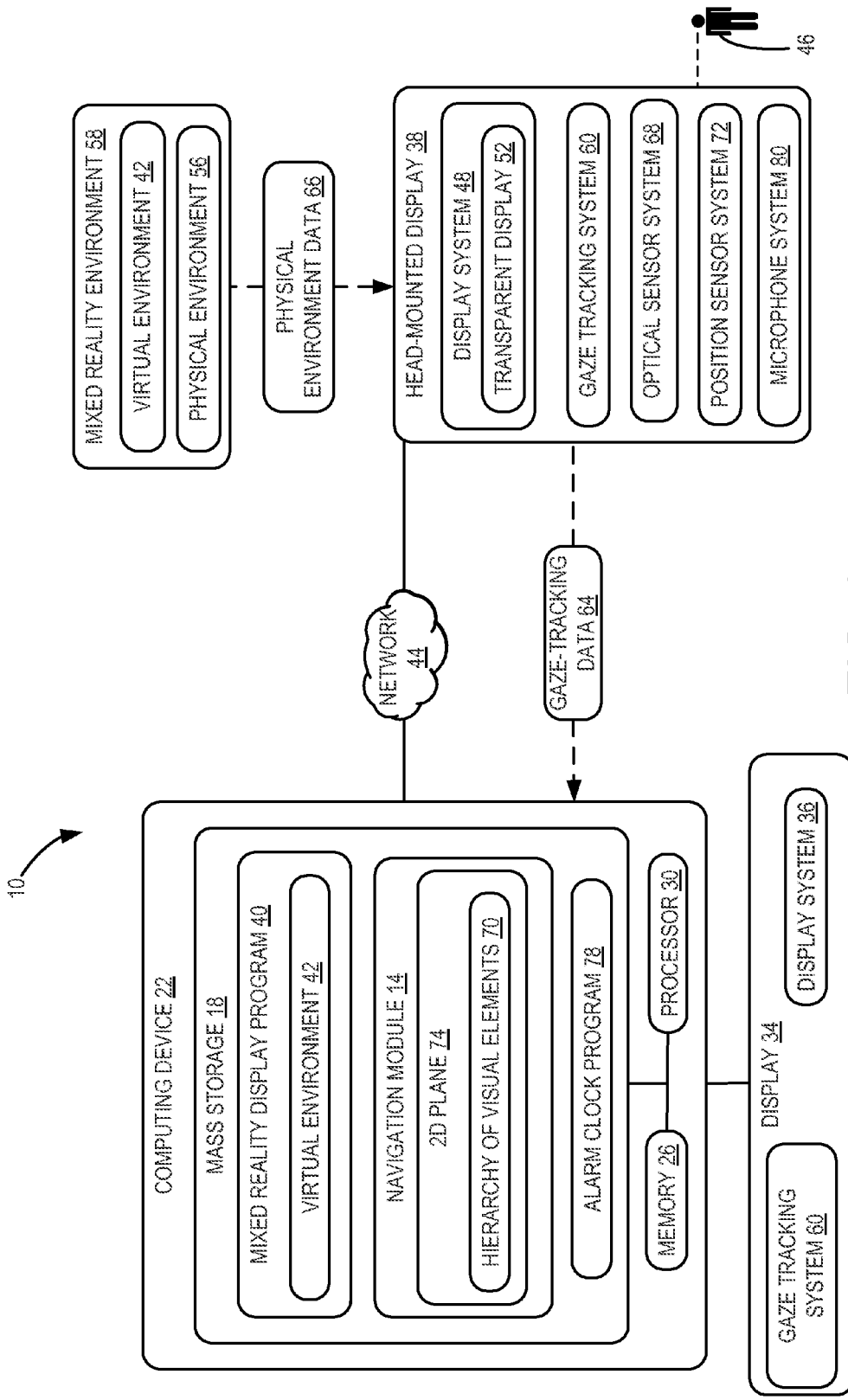
FIG. 1 is a schematic view of a user interface system for navigating a hierarchy of visual elements according to an embodiment of the present disclosure.

FIG. 1 shows a schematic view of one embodiment of a user interface system 10 for navigating a hierarchy of visual elements. The user interface system 10 includes a navigation module 14 that may be stored in mass storage 18 of a computing device 22. The navigation module 14 may be loaded into memory 26 and executed by a processor 30 of the computing device 22 to perform one or more of the methods and processes described in more detail below.

The user interface system 10 may include a display device that is operatively connected to computing device 22. In one example, the display device may comprise a separate display 34, such as a standalone monitor for example, that is operatively connected to computing device 22 via a wired or wireless connection. As described in more detail below, display 34 may include a display system 36 for presenting one or more visual elements to a user and a gaze tracking system 60.

In other examples, computing device 22 may be integrated into the display 34 to form a single device. Such devices may include, for example, hand-held smart phones, e-readers, laptop, notebook and tablet computers, etc. It will be appreciated that many other types and configurations of display devices having various form factors, whether separate from or integrated with computing device 22, may also be used and are within the scope of the present disclosure.

The computing device 22 may take the form of a desktop computing device, a mobile computing device such as a smart phone, laptop, notebook or tablet computer, network computer, home entertainment computer, interactive television, gaming system, or other suitable type of computing device.

Additional details regarding the components and computing aspects of the computing device 22 are described in more detail below with reference to FIG. 11.

In other examples, the display device may take the form of a virtual or mixed-reality capable device, such as head-mounted display (HMD) device 38, that may create a mixed reality environment 58. In these examples, the user interface system 10 may include a mixed reality display program 40 that may generate a virtual environment 42 for display via HMD device 38. The virtual environment 42 may include one or more virtual images, such as three-dimensional (3D) holographic objects and two-dimensional (2D) virtual images, that are generated and displayed via HMD device 38.

The computing device 22 may be operatively connected with the HMD device 38 using a wired connection, or may employ a wireless connection via WiFi, Bluetooth, or any other suitable wireless communication protocol. For example, the computing device 22 may be communicatively coupled to a network 44. The network 44 may take the form of a local area network (LAN), wide area network (WAN), wired network, wireless network, personal area network, or a combination thereof, and may include the Internet. Additionally, the example illustrated in FIG. 1 shows the computing device 22 as a separate component from the HMD device 38. It will be appreciated that in other examples the computing device 22 may be integrated into the HMD device 38.

Figure 2:
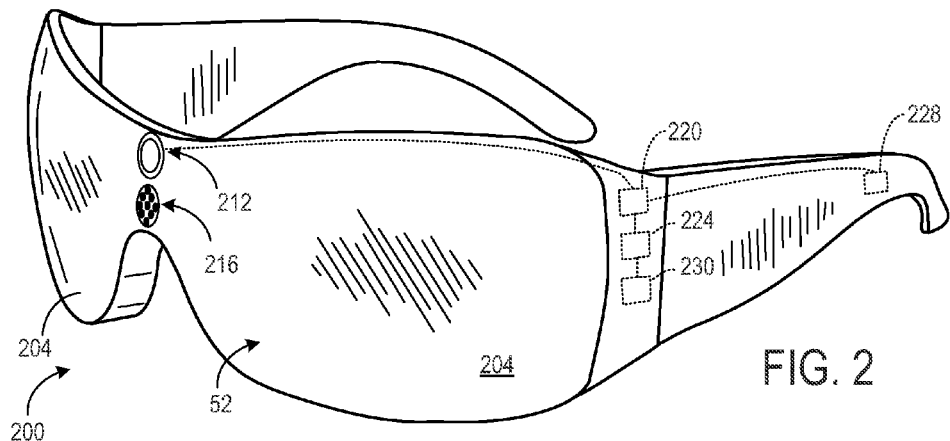
FIG. 2 shows an example head-mounted display device according to an embodiment of the present disclosure.

With reference now also to FIG. 2, one example of an HMD device 200 in the form of a pair of wearable glasses with a transparent display 52 is provided. It will be appreciated that in other examples, the HMD device 200 may take other suitable forms in which a transparent, semi-transparent or non-transparent display is supported in front of a viewer's eye or eyes. It will also be appreciated that the HMD device 38 shown in FIG. 1 may take the form of the HMD device 200, as described in more detail below, or any other suitable HMD device.

With reference to FIGS. 1 and 2, the HMD device 38 includes an HMD display system 48 and transparent display 52 that enables images such as holographic objects to be delivered to the eyes of a user 46. The transparent display 52 may be configured to visually augment an appearance of a physical environment 56 to a user 46 viewing the physical environment through the transparent display. For example, the appearance of the physical environment 56 may be augmented by graphical content (e.g., one or more pixels each having a respective color and brightness) that is presented via the transparent display 52 to create the mixed reality environment 58.

The transparent display 52 may also be configured to enable a user to view a physical, real-world object in the physical environment 56 through one or more partially transparent pixels that are displaying a virtual object representation. As shown in FIG. 2, in one example the transparent display 52 may include image-producing elements located within lenses 204 (such as, for example, a see-through Organic Light-Emitting Diode (OLED) display). As another example, the transparent display 52 may include a light modulator on an edge of the lenses 204. In this example the lenses 204 may serve as a light guide for delivering light from the light modulator to the eyes of a user. Such a light guide may enable a user to perceive a 3D holographic image located within the physical environment 56 that the user is viewing, while also allowing the user to view physical objects in the physical environment, thus creating a mixed reality environment.

The HMD device 38 may also include various sensors and related systems. For example, the HMD device 38 may include a gaze tracking system 60 that utilizes at least one inward facing sensor 212. The inward facing sensor 212 may be an image sensor that is configured to acquire image data in the form of gaze tracking data 64 from a user's eyes. Provided the user has consented to the acquisition and use of this information, the gaze tracking system 60 may use this information to track a position and/or movement of the user's eyes.

In one example, the gaze tracking system 60 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the gaze tracking system 60 may then determine a direction and/or at what physical object or virtual object the user is gazing. The gaze tracking system 60 may further determine at what point on a physical or virtual object the user is gazing. Such gaze tracking data 64 may then be provided to the computing device 22. It will be understood that the gaze detection subsystem may have any suitable number and arrangement of light sources and image sensors.

The HMD device 38 may also include sensor systems that receive physical environment data 66 from the physical environment 56. For example, the HMD device 38 may include an optical sensor system 68 that utilizes at least one outward facing sensor 216, such as an optical sensor, to capture image data. Outward facing sensor 216 may detect movements within its field of view, such as gesture-based inputs or other movements performed by a user 46 or by a person or physical object within the field of view. Outward facing sensor 216 may also capture two-dimensional image information and depth information from physical environment 56 and physical objects within the environment. For example, outward facing sensor 216 may include a depth camera, a visible light camera, an infrared light camera, and/or a position tracking camera.

The HMD device 38 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 216 may capture images of the physical environment 56 in which a user 46 is situated. In one example, the mixed reality display program 40 may include a 3D modeling system that uses such input to generate a virtual environment 42 that models the physical environment 56 surrounding the user 46.

The HMD device 38 may also include a position sensor system 72 that utilizes one or more motion sensors 220 to capture position data 76, and thereby enable motion detection, position tracking and/or orientation sensing of the HMD device. For example, the position sensor system 72 may be utilized to determine a direction, velocity and acceleration of a user's head. The position sensor system 72 may also be utilized to determine a head pose orientation of a user's head. In one example, position sensor system 72 may comprise an inertial measurement unit configured as a six-axis or six-degree of freedom position sensor system. This example position sensor system may, for example, include three accelerometers and three gyroscopes to indicate or measure a change in location of the HMD device 38 within three-dimensional space along three orthogonal axes (e.g., x, y, z), and a change in an orientation of the HMD device about the three orthogonal axes (e.g., roll, pitch, yaw).

Position sensor system 72 may also support other suitable positioning techniques, such as GPS or other global navigation systems. Further, while specific examples of position sensor systems have been described, it will be appreciated that other suitable position sensor systems may be used. In some examples, motion sensors 220 may also be employed as user input devices, such that a user may interact with the HMD device 38 via gestures of the neck and head, or even of the body. The HMD device 38 may also include a microphone system 80 that includes one or more microphones 224 that capture audio data. In other examples, audio may be presented to the user via one or more speakers 228 on the HMD device 38.

The HMD device 38 may also include a processor 230 having a logic subsystem and a storage subsystem, as discussed in more detail below with respect to FIG. 11, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 52.

It will be appreciated that the HMD device 38 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 38 may include additional and/or alternative sensors, cameras, microphones, input devices, output devices, etc. without departing from the scope of this disclosure. Further, the physical configuration of the HMD device 38 and its various sensors and subcomponents may take a variety of different forms without departing from the scope of this disclosure.

Figure 3:
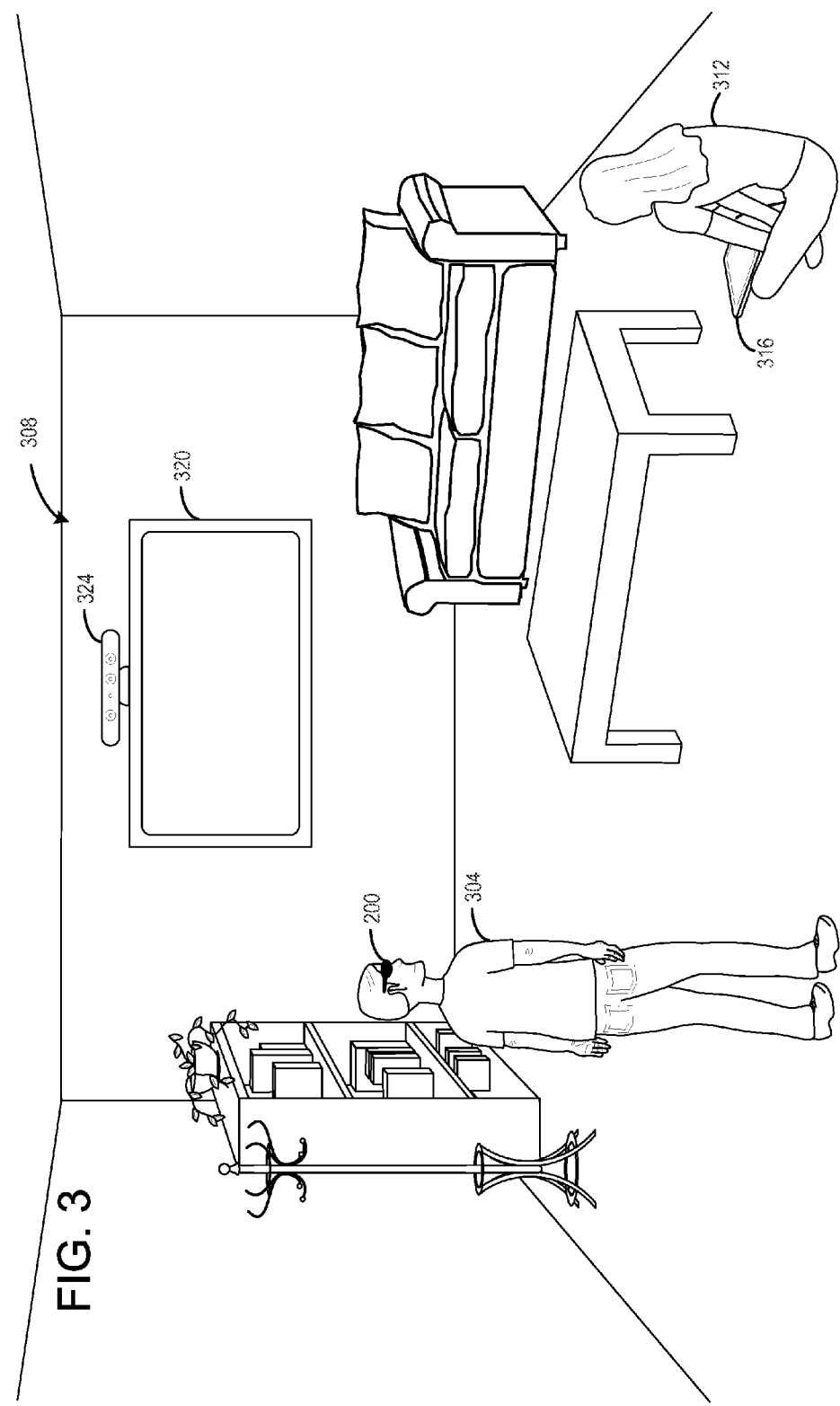
FIG. 3 is a schematic perspective view of a room including a user wearing the head-mounted display device of FIG. 2, a wall-mounted display, and another user holding a tablet computer.

With reference now to FIGS. 3-9, descriptions of example use cases and embodiments of the user interface system 10 will now be provided. FIG. 3 provides a schematic illustration of a user 304 located in a physical environment that comprises a living room 308, with the user experiencing a mixed reality environment 58 via an HMD device 38 in the form of HMD device 200. As discussed in more detail below, navigation module 14 may be configured to display a hierarchy of visual elements via HMD device 200, and to enable user 304 to navigate the hierarchy via gaze tracking.

Another user 312 may hold a tablet computer 316 that includes user interface system 10 and includes a gaze tracking system as described above. The living room 308 may also include a wall-mounted display 320 that may be operatively connected to a gaming system 324. The gaming system 324 and/or display 320 may also include user interface system 10 and a gaze tracking system as described above. For purposes of the following description, use cases of the user interface system 10 in connection with the tablet computer 316 will be described. It will also be appreciated that any suitable display device may also be utilized.

As shown in FIG. 1, the navigation module 14 may receive or may generate a hierarchy of visual elements 70 in which the elements are disposed throughout a 2D plane 74. With reference now to FIG. 4, a schematic view of one example of a hierarchy of visual elements 70 disposed in a 2D plane 74 is provided. FIG. 4 also illustrates a corresponding schematic view of a viewable region 404 of a display device 408, such as tablet computer 316, that is displaying a portion of the visual elements 70 in the 2D plane 74. As described in more detail below, the navigation module 14 enables a user to naturally and intuitively navigate among the visual elements 70 in the 2D plane 74 by pulling one or more desired elements into the viewable region 404 via eye-gaze.

In this example, the visual elements 70 relate to an alarm clock program 78 and comprise designations AM, PM, and MIL (for military), along with a column of numbers representing an hour setting and a column of numbers representing a minute setting for an alarm. Locations and directions of movement within the 2D plane 74 may be referenced to a horizontal axis X and a vertical axis Y. It will be appreciated that in other examples, any suitable hierarchy of data represented by visual elements may be navigated using the user interface system 10 as described herein.

As shown in FIG. 4, the visual elements 70 in the 2D plane 74 are arranged in a hierarchical fashion, such that each of the elements is directly subordinate to no more than one other element. In this example, the hierarchy of visual elements 70 includes three levels or columns A, B and C. The visual elements PM, AM, and MIL may be described as apex elements to which all of the other visual elements are subordinate, either directly or indirectly. For example, the number 5 is directly subordinate to the apex element AM, and is indirectly subordinate to the apex elements PM and MIL. Additionally, in this example some visual elements 70, such as the number 12, are not directly subordinate to a parent visual element.

Further, in this example hierarchy no more than three child visual elements are provided for each parent visual element. For example, the numbers 1, 2 and 3 are the child visual elements relative to the parent visual element PM. It will be appreciated that many other variations and different arrangements of hierarchies of visual elements may be used in connection with the user interface system 10 described herein. Such other hierarchies may include fewer or more of levels of visual elements 70.

As noted above, FIG. 4 shows a schematic view of a viewable region 404 of a display device 408 that is displaying a portion of the visual elements 70 in the 2D plane 74 illustrated below the display device. To facilitate description, an indication 404' of the viewable region 404 and an indication 408' of the display device 408 are provided overlaying the 2D plane 74 to indicate the corresponding portion of the 2D plane that is displayed within the viewable region.

To facilitate navigation, the navigation module 14 may establish a proportional size relationship between each visual element 70 in the 2D plane 74 and each of the other visual elements in the plane. For purposes of this disclosure, a "proportional size relationship" between two visual elements 70 is defined as a first visual element having a first size that is proportional to a second size of a second visual element when viewed in the viewable region 404.

For example, and in the examples shown in FIGS. 4-7, the number 7 in column B has a proportional size relationship relative to the other numbers in column B. In this proportional size relationship, the number 7 and the other numbers in column B have the same size. Further, this proportional size relationship among the visual elements 70 in column B is maintained regardless of their position or actual displayed size within the viewable region 404 of the display 408. In other words, the visual elements 70 in column B maintain the same size relative to one another regardless of their position within the viewable region 404. In the present example, this proportional size relationship also holds true for the visual elements 70 in columns A and C.

The visual elements 70 in column B also have a proportional size relationship relative to the visual elements 70 in columns A and C. In another example and as shown in FIGS. 4-7, each of the visual elements PM, AM, and MIL in column A may be 150% larger than each of the visual elements in column B. This proportional size relationship is also maintained regardless of the position or actual size of these visual elements 70 within the viewable region 404.

For example, the visual element AM may be displayed in a size 150% larger than the size of the number 7, regardless of the position or actual size of these visual elements within the viewable region 404. In a similar manner, each of the visual elements 70 in column B may be 120% larger than each of the visual elements in column C, regardless of the position or displayed size of these visual elements within the viewable region 404.

It will be appreciated that various other proportional size relationships having different size differentials between visual elements 70 of different columns may also be utilized. It will also be appreciated that in the disclosed examples shown in FIGS. 4-7 the proportional size relationships vary with respect to a horizontal or X-axis direction. In other examples, the proportional size relationships may vary with respect to a vertical or Y-axis direction. It will also be appreciated that FIGS. 4-7 are schematic illustrations and may not be rendered to scale.

In other examples, the navigation module 14 may be configured such that all visual elements 70 displayed in a center of the viewable region 404 may be displayed in the same size. In these examples, the proportional size relationships among the visual elements may be scaled accordingly. In one example, a sum of a geometric series may be used to ensure that the progressive enlargement of visual elements 70, described in more detail below, uniformly results in a consistent size of a visual element at the center of the viewable region 404.

As schematically illustrated in FIGS. 4-7, and as viewed from right to left along the X-axis, the visual elements 70 increase in size from one column to the next. Further, as noted above and explained in more detail below, the proportional size relationships are maintained as a user navigates through the hierarchy of visual elements 70, and as different elements change size as they move through the viewable region 404 of the display 408. Advantageously, maintaining the proportional size relationship among the visual elements 70 in this manner provides a user with a consistent and natural visual experience of navigating through the multiple levels of the hierarchy of visual elements.

Figure 5:
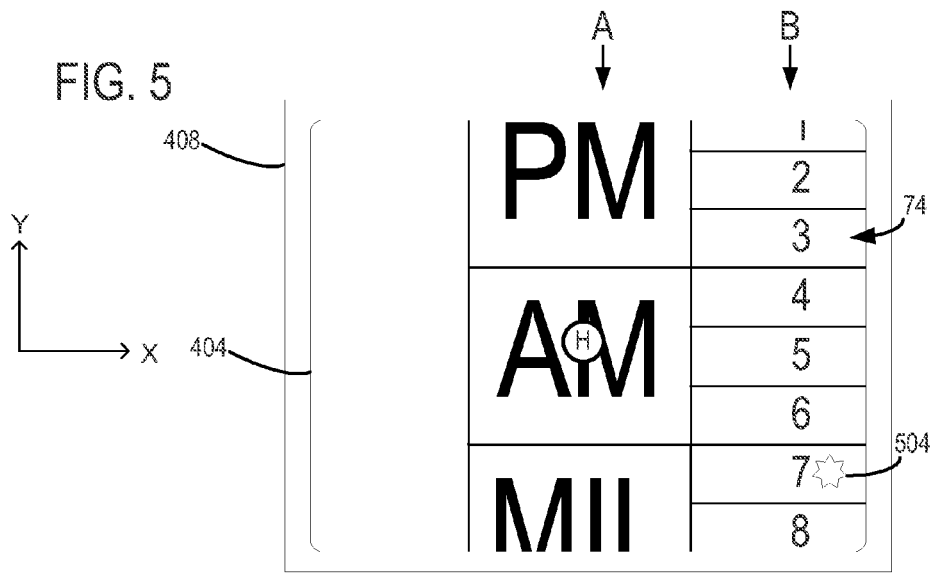
FIG. 5 is a schematic view of the viewable region of the display device of FIG. 4 displaying a portion of the hierarchy of visual elements and showing a home location and a gaze location.

Examples of facilitating navigation of the 2D plane 74 of visual elements 70 via gaze tracking will now be provided. With reference now to FIG. 5, a schematic view of the viewable region 404 of display device 408 is provided. The viewable region 404 is displaying a portion of the hierarchy of visual elements 70 in the 2D plane 74 shown in FIG. 4. FIG. 5 also shows a home location H that is established by the navigation module 14 and is located, in this example, at the center of the viewable region 404. In other examples the home location H may be located elsewhere in the viewable region 404. As shown in FIG. 4, the home location H is also mapped to a corresponding location in the 2D plane 74.

As explained in more detail below and illustrated in FIGS. 6 and 7, the home location H remains fixed at the location shown relative to the viewable region 404, while the hierarchy of visual elements 70 may scroll or pan through the viewable region 404 as a user navigates the hierarchy. In some examples, the home location H may be displayed to a user viewing the display device 408, and may be indicated by an H in a circle as shown or in any other suitable manner. In other examples, the home location may not be displayed to the user.

A gaze tracking system of the display device 408 may provide gaze tracking data 64 to the navigation module 14. Using this gaze tracking data, the navigation module 14 may determine a gaze location at which the user 312 is gazing within the viewable region 408 of the display device 408. In FIGS. 5-7 the gaze location 504 is indicated by star, which may or may not be displayed to the user 312. As shown in FIG. 4, the gaze location 504 is also mapped to a corresponding target location 504' in the 2D plane 74.

In this example, the gaze location 504 and corresponding target location 504' are spaced from the home location H along the horizontal X-axis and the vertical Y-axis. It will be appreciated that in other examples, the gaze location 504 and corresponding target location 504' may be spaced from the home location H solely along the horizontal X-axis (that is, vertically aligned with the home location H). In other examples, the gaze location 504 and corresponding target location 504' may be spaced from the home location H solely along the vertical Y-axis (that is, horizontally aligned with the home location H).

Based on determining the gaze location 504 and corresponding target location 504' in the 2D plane 74, the navigation module 14 is configured to initiate movement of the target location 504' toward the home location H, with such movement generally indicated by action arrow M. Further, the target location 504' in the 2D plane 74 is "fixed" to the 2D plane, such that movement of the target location causes corresponding movement of the 2D plane. Alternatively expressed and with reference to FIG. 4, as the target location 504' moves toward the home location H, all of the visual elements 70 in the 2D plane 74 correspondingly move with the 2D plane.

The navigation module 14 is configured to determine the user's gaze location at periodic intervals corresponding to a particular sampling rate or frequency, such as 30 Hz, 60 Hz, 120 Hz, or any other suitable rate. With each sample, if the user's gaze location has changed from the previous sample, the navigation module 14 updates the gaze location 504 and corresponding target location 504'. The navigation module 14 then initiates movement of the target location 504' toward the home location. In this manner, it will be appreciated that the user interface system 10 creates a navigation experience in which the 2D plane 74 and the visual elements 70 at or near the user's gaze location 504 are perceived to be moving toward the home location H.

In one example and with reference to FIGS. 4 and 5, a user may be interested in selecting the number 7 from the 2D plane 74. The user may initially gaze at the gaze location 504 corresponding to target location 504'. As the target location 504' and corresponding position on the 2D plane 74 then move toward the home location H, the user's gaze may follow this position on the 2D plane until the user's gaze location 504 meets the home location H, as illustrated in FIG. 7. In this manner, the user interface system 10 enables the user to guide or steer the number 7 to the home location H in the center of the viewable region. It will also be appreciated that FIG. 6 illustrates a position of the 2D plane 74 and gaze location 504 between the initial position shown in FIG. 5 and the position at the home location H shown in FIG. 7.

Figure 6:
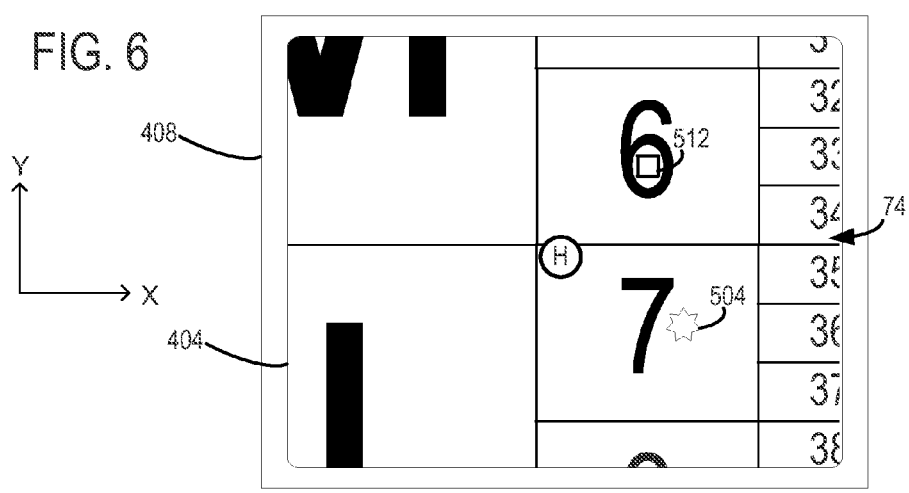
FIG. 6 is a schematic view of the viewable region of the display device of FIG. 5 showing the plane of visual elements translated relative to the viewable region and the visual elements correspondingly enlarged.
Figure 7:
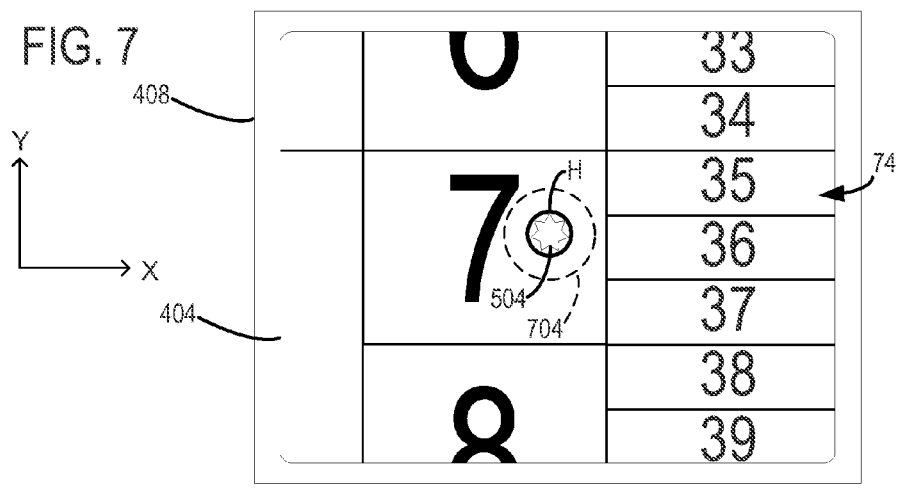
FIG. 7 is a schematic view of the viewable region of the display device of FIG. 6 showing the plane of visual elements further translated relative to the viewable region, and the visual elements correspondingly further enlarged.
Figure 8:
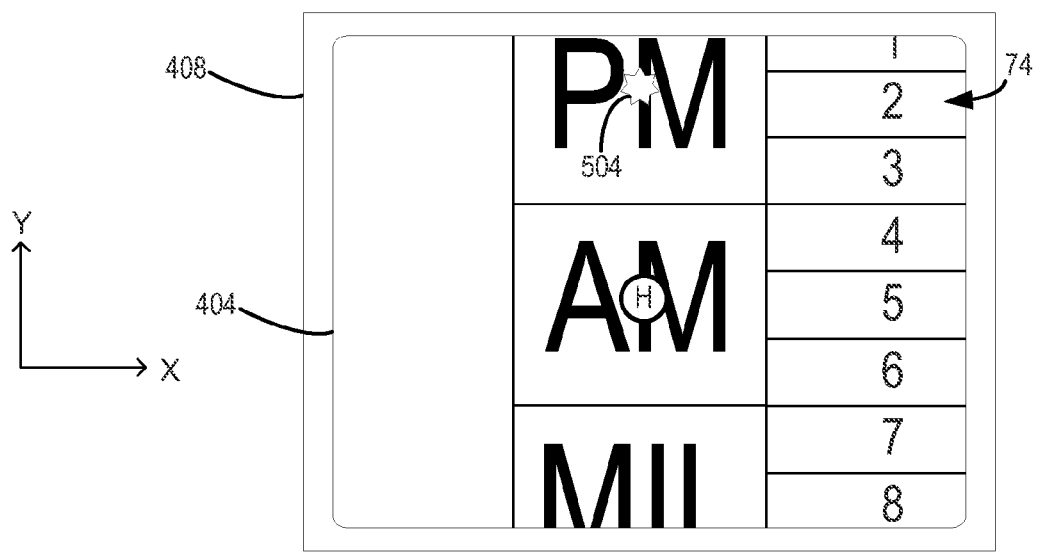
FIG. 8 is a schematic view of the viewable region of a display device showing a gaze location above a home location in the viewable region.
Figure 9:
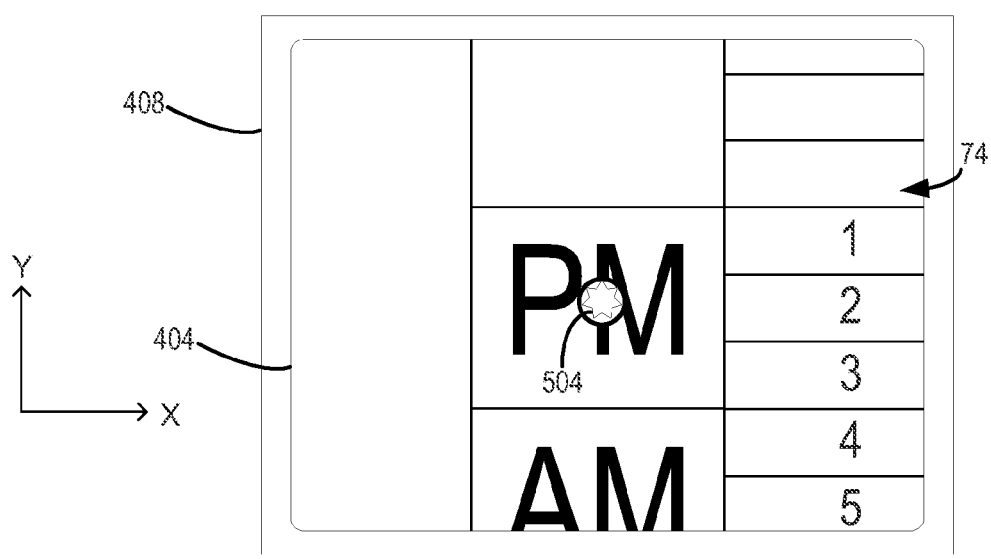
FIG. 9 is a schematic view of the viewable region of the display device of FIG. 8 showing the plane of visual elements translated downwardly relative to the viewable region, and the visual elements correspondingly unmodified in size.

Additionally, and as illustrated in FIGS. 5-7, as the target location 504' moves closer to the home location H, each of the visual elements 70 that are viewable within the viewable region 404 are progressively enlarged while the proportional size relationship between each element and each other element is also maintained. For example, it will be appreciated that the number 7 increases in size as it moves from the position shown in FIG. 5 to the position shown in FIG. 7. As another example, the letter M in the visual element AM increases in size from FIG. 5 to FIG. 6. It will be appreciated that in FIG. 7 the letter M has moved beyond the viewable region 404 of the display 408, and is thus no longer in view.

In some examples, the size of the visual elements 70 in a given column may be vertically uniform and proportional only to an element's horizontal location along the X-axis. Alternatively expressed and with reference to FIG. 4, the visual elements PM, AM and MIL in column A may all have the same size, such as 72 point type. Similarly, the visual elements 1-23 in column B may all have the same size, such as 28 point type. The visual elements 0-59 in column C may also have the same size, such as 8 point type. Accordingly, as the visual elements 70 move through a particular location in the 2D plane 74, each element will have the same size at that location. Additionally, in some examples each visual element 70 that arrives at the home location H will be displayed in the same size.

In one example, the visual elements 70 are progressively enlarged only in relation to movement of the target location 504' and 2D plane 74 in a negative X-axis direction (in other words, right to left in FIGS. 4-7). Correspondingly, the visual elements 70 are progressively shrunken only in relation to movement of the target location 504' and 2D plane 74 in a positive X-axis direction (in other words, left to right in FIGS. 4-7). Thus, in this example the size of a visual element 70 displayed in the viewable region 404 is directly related to its position along the X-axis in the region.

Additionally, in this example the visual elements 70 are not resized or otherwise modified in relation to movement of the target location 504' and 2D plane 74 in a Y-axis direction, whether positive or negative (in other words, up and down in FIGS. 4-7). For example and with reference to FIGS. 8 and 9, as the user's gaze location 504 and corresponding target location 504' move vertically downwardly toward the home location H, the visual elements PM, AM, MIL and numbers 1-8 remain fixed in size while also maintaining their proportional size relationship to one another.

The navigation module 14 may also be configured to control the velocity of the movement of the target location 504' and 2D plane 74 based on the distance of the target location 504' from the home location H. In one example, the navigation module 14 may proportionally decrease the velocity of the movement of the target location 504' toward the home location H as the distance of the target location from the home location H decreases.

For example and with reference to FIG. 5, upon initiating movement of the target location 504' corresponding to gaze location 504 toward the home location H, the visual elements 70 in the viewable region 404 may be given a velocity of 4 cm/sec. When the target location 504' and corresponding gaze location 504 reach the location closer to the home location H shown in FIG. 6, the visual elements 70 in the viewable region 404 may be given a lower velocity that is proportional to the decreased distance to the home location H, such as 2 cm/sec. The velocity of the visual elements 70 may also linearly decrease between the target locations 504' of FIGS. 5 and 6.

With reference to FIG. 7, the velocity of the visual elements 70 may further decrease between the gaze locations 504 and corresponding target locations 504' of FIGS. 6 and 7. When the target location 504' and corresponding gaze location 504 reach the home location H, movement of the visual elements 70 and 2D plane 74 may stop. At this point, and as described in more detail below, the user may select a visual element 70 that is associated with the target location 504'. In one example, the visual element 70 that is closest to the target location 504' may be associated with the target location. In the example shown in FIG. 7, the number 7 may be associated with the target location 504'.

The display device 408 may then receive user input indicating a user selection of the number 7. Based on this user input, the navigation module 14 may then select the number 7. The user input may comprise, for example, verbal instructions from the user, gestures made by the user's hands, head, body, etc., input received by the gaze tracking system, such as successive eye blinks, an eye gaze dwell at a particular location for a predetermined time, input via a separate input device such as a keyboard or mouse, or any other suitable user input.

In one example, the navigation module 14 may be configured to select the visual element 70 associated with the target location 504' based on the user input only when the target location lies within a pause region surrounding the home location. With reference to FIG. 7, in one example a pause region 704 may comprise a circular region having a predetermined diameter and surrounding the home location H. When the target location 504' and corresponding gaze location 504 lie within the pause region 704, the navigation module 14 may allow selection of a visual element via user input. It will be appreciated that the pause region 704 and home location H may be located in any suitable location within the viewable region 404. Further, the pause region 704 may be of any suitable size and shape.

In another example, the navigation module 14 may be configured to refrain from initiating movement of the target location 504' toward the home location H when at least a portion of the target location lies within the pause region 704. Alternatively expressed, movement of the target location 504' toward the home location H may cease when at least a portion of the target location lies within the pause region 704. For example, once the target location 504' and corresponding gaze location 504 cross a border of the pause region 704, the movement of the visual elements 70 and 2D plane 74 may cease.

Advantageously, this may enable and assist a user in focusing on a particular visual element 70, such as the number 7, when the associated target location 504' reaches the pause region 704 of the viewable region 404. Further, utilizing a pause region 704 in this manner may help avoid unintended movement of the particular visual element 70 as the user 312 moves her gaze to read or examine the element, or the user's eyes experience saccades or other involuntary movements. Accordingly, the pause region 704 may provide a rest state that provides a stationary visual element 70 for ease of reading.

In another example, the navigation module 14 may be configured to significantly slow the movement of the target location 504' and corresponding gaze location 504 toward the home location H when the target location lies within the pause region 704. For example, just outside the pause region 704 the velocity of the target location 504' toward the home location H may be 1.0 cm/sec. Once at least a portion of the target location 504' lies within the pause region 704, the velocity of the target location may be reduced to 0.1 cm/sec. It will be appreciated that any suitable velocities and velocity differentials may be utilized.

It will also be appreciated that a user may horizontally scroll through the hierarchy of visual elements 70. In one example, the user may fix her gaze at a location in the viewable region 404 to the right of the home location H, such as on the number 5 in FIG. 4. As the user continues to gaze at this location on the display, the 2D plane 74 will advance from right to left across the display 408 such that numbers on column C enter the viewable region 404. Similarly, the user may fix her gaze at a location in the viewable region 404 to the left of the home location H, such as to the left of the number 7 in FIG. 7. As the user continues to gaze at this location on the display, the 2D plane 74 will advance from left to right across the display 408, and the visual elements 70 will correspondingly decrease in size.

With reference again to FIG. 6 and in another example, when the gaze location 504 reaches the location shown, the user may divert her gaze to a different gaze location 512 inside the number 6. At this point the gaze location 512 and corresponding new target location 512' (not shown) may be utilized by the navigation module 14 to initiate movement of the new target location 512' toward the home location H. Accordingly, the corresponding target location 512', 2D plane 74 and visual elements 70 also move correspondingly.

It will be appreciated that the user interface system 10 and various embodiments describe above may enable a user to naturally and smoothly navigate a hierarchy of visual elements. By mapping motion along one axis to a zoom or enlargement function applied to the visual elements 70, the user interface system 10 may operate to provide a consistent element size at all levels of the hierarchy. It will also be appreciated that the user interface system 10 may be utilized with any hierarchy of visual elements that may be represented in a 2D plane.

In one use case example, a user may instantiate the alarm clock program 78 to set an alarm time via, for example, the tablet computer 316. In this example, the user may desire to set an alarm time of 7:30 am. With reference to FIG. 4, the navigation module 14 may initially display within the viewable region 404 column A of the visual elements 70 within the 2D plane 74. As the AM visual element is displayed over the home location H, the user may select AM in any suitable manner as described above.

The user may next look to the number 7 at, for example, the gaze location 504 and corresponding target location 504'. As described above, the target location 504' may then move toward the home location H. The user may keep her gaze at the location next to the number 7 and follow this location to the home location H, where movement of the target location and the visual elements in the 2D plane 74 ceases. The user may then select the number 7.

With reference to FIG. 7, the user may then direct her gaze to an upper right area of the viewable region 404 and thereby cause the visual elements 70 to scroll downwardly and to the left until the number 30 comes into view in the viewable region. The user may then gaze at or near the number 30 and follow this location to the home location H. The user then may select the number 30, and thereby enter an alarm time of 7:30 am.

FIGS. 10A and 10B illustrate a flow chart of a method 1000 for navigating a hierarchy of visual elements according to an embodiment of the present disclosure. The following description of method 1000 is provided with reference to the software and hardware components of the user interface system 10 described above and shown in FIGS. 1-9. It will be appreciated that method 1000 may also be performed in other contexts using other suitable hardware and software components.

With reference to FIG. 10A, at 1002 the method 1000 includes providing a hierarchy of visual elements comprising a 2D plane including a first axis and a second axis orthogonal to the first axis. At 1006 the method 1000 may include presenting one or more visual elements via a display system of a display device including a gaze tracking system. At 1008 the visual elements may include one or more apex elements and a plurality of subordinate elements that are subordinate to the one or more apex elements, where each subordinate element is subordinate to no more than one other element of the visual elements. At 1010 the method 1000 may include establishing a home location within a viewable region of the display device.

At 1012 the method 1000 may include establishing a proportional size relationship between each of the visual elements and each of the other visual elements in the plane. At 1014 the method 1000 may include receiving gaze tracking data from the gaze tracking system. At 1018 the method 1000 may include, using the gaze tracking data, determining a gaze location at which the user is gazing within the viewable region. At 1022 the method 1000 may include mapping the gaze location to a target location in the 2D plane, where the target location is spaced from the home location along the first axis.

At 1026 the method 1000 may include initiating movement of the target location toward the home location, where the movement comprises a first component along the first axis. With reference now to FIG. 10B, at 1030 the method 1000 may include, as the target location moves closer to the home location, progressively enlarging each of the visual elements that are viewable within the viewable region while also maintaining the proportional size relationship between each of the visual elements and each of the other visual elements.

At 1034 the method 1000 may include progressively enlarging each of the visual elements as the target location moves closer to the home location in a first direction along the first axis. At 1038 the method 1000 may include progressively shrinking each of the visual elements as the target location moves closer to the home location in a second direction opposite to the first direction along the first axis.

At 1042 the method 1000 may include refraining from initiating movement of the target location toward the home location when the target location lies within a pause region surrounding the home location. At 1046 the method 1000 may include proportionally decreasing the velocity of movement of the target location toward the home location as the distance of the target location from the home location decreases. At 1050 the method 1000 may include, where the target location is also spaced from the home location along the second axis, and the movement further comprises a second component along the vertical axis, refraining from modifying the visual elements viewable via the display in relation to the second component of the movement of the target location.

At 1058 the method 1000 may include receiving user input. At 1062 the method 1000 may include, based on the user input, selecting one of the visual elements that is associated with the target location. At 1066 the method 1000 may include selecting the visual element that is associated with the target location based on the user input only when the target location lies within a pause region surrounding the home location.

It will be appreciated that method 1000 is provided by way of example and is not meant to be limiting. Therefore, it is to be understood that method 1000 may include additional and/or alternative steps than those illustrated in FIGS. 10A and 10B. Further, it is to be understood that method 1000 may be performed in any suitable order. Further still, it is to be understood that one or more steps may be omitted from method 1000 without departing from the scope of this disclosure.

Figure 11:
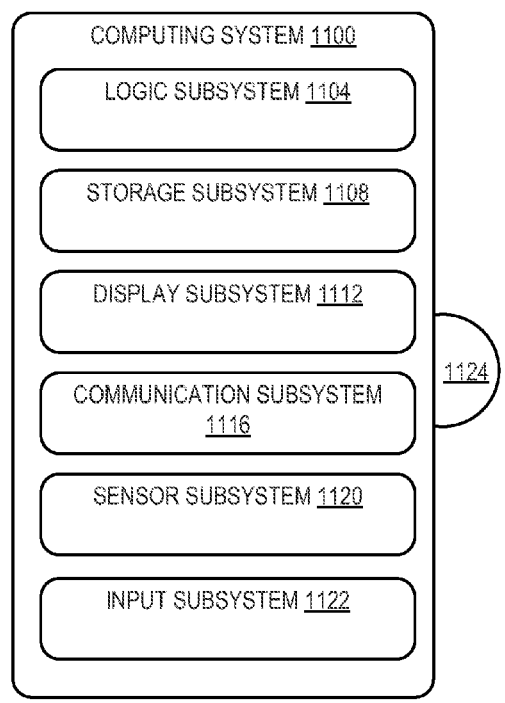
FIG. 11 is a simplified schematic illustration of an embodiment of a computing device.

FIG. 11 schematically shows a nonlimiting embodiment of a computing system 1100 that may perform one or more of the above described methods and processes. Computing device 22 may take the form of computing system 1100. Computing system 1100 is shown in simplified form. It is to be understood that virtually any computer architecture may be used without departing from the scope of this disclosure. In different embodiments, computing system 1100 may take the form of a mainframe computer, server computer, desktop computer, laptop computer, tablet computer, home entertainment computer, network computing device, mobile computing device, mobile communication device, gaming device, etc. As noted above, in some examples the computing system 1100 may be integrated into a display device.

As shown in FIG. 11, computing system 1100 includes a logic subsystem 1104 and a storage subsystem 1108. Computing system 1100 may optionally include a display subsystem 1112, a communication subsystem 1116, a sensor subsystem 1120, an input subsystem 1122 and/or other subsystems and components not shown in FIG. 11. Computing system 1100 may also include computer readable media, with the computer readable media including computer readable storage media and computer readable communication media. Computing system 1100 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1104 may include one or more physical devices configured to execute one or more instructions. For example, the logic subsystem 1104 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1104 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1108 may include one or more physical, persistent devices configured to hold data and/or instructions executable by the logic subsystem 1104 to implement the herein described methods and processes. When such methods and processes are implemented, the state of storage subsystem 1108 may be transformed (e.g., to hold different data).

Storage subsystem 1108 may include removable media and/or built-in devices. Storage subsystem 1108 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1108 may include devices with one or more of the following characteristics: volatile, nonvolatile, dynamic, static, read/write, read-only, random access, sequential access, location addressable, file addressable, and content addressable.

In some embodiments, aspects of logic subsystem 1104 and storage subsystem 1108 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 11 also shows an aspect of the storage subsystem 1108 in the form of removable computer readable storage media 1124, which may be used to store data and/or instructions executable to implement the methods and processes described herein. Removable computer-readable storage media 1124 may take the form of CDs, DVDs, HD-DVDs, Blu-Ray Discs, EEPROMs, and/or floppy disks, among others.

It is to be appreciated that storage subsystem 1108 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 1112 may be used to present a visual representation of data held by storage subsystem 1108. As the above described methods and processes change the data held by the storage subsystem 1108, and thus transform the state of the storage subsystem, the state of the display subsystem 1112 may likewise be transformed to visually represent changes in the underlying data. The display subsystem 1112 may include one or more display devices utilizing virtually any type of technology. Such display devices may be combined with logic subsystem 1104 and/or storage subsystem 1108 in a shared enclosure, or such display devices may be peripheral display devices. The display subsystem 1112 may include, for example, the display system 48 and transparent display 52 of the HMD device 38.

When included, communication subsystem 1116 may be configured to communicatively couple computing system 1100 with one or more networks and/or one or more other computing devices. Communication subsystem 1116 may include wired and/or wireless communication devices compatible with one or more different communication protocols. As nonlimiting examples, the communication subsystem 1116 may be configured for communication via a wireless telephone network, a wireless local area network, a wired local area network, a wireless wide area network, a wired wide area network, etc. In some embodiments, the communication subsystem may allow computing system 1100 to send and/or receive messages to and/or from other devices via a network such as the Internet.

Sensor subsystem 1120 may include one or more sensors configured to sense different physical phenomenon (e.g., visible light, infrared light, sound, acceleration, orientation, position, etc.) as described above. Sensor subsystem 1120 may be configured to provide sensor data to logic subsystem 1104, for example. As described above, such data may include eye-tracking information, image information, audio information, ambient lighting information, depth information, position information, motion information, user location information, and/or any other suitable sensor data that may be used to perform the methods and processes described above.

When included, input subsystem 1122 may comprise or interface with one or more sensors or user-input devices such as a game controller, gesture input detection device, voice recognizer, inertial measurement unit, keyboard, mouse, or touch screen. In some embodiments, the input subsystem 1122 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "module" may be used to describe an aspect of the user interface system 10 that is implemented to perform one or more particular functions. In some cases, such a module may be instantiated via logic subsystem 1104 executing instructions held by storage subsystem 1108. It is to be understood that different modules may be instantiated from the same application, service, code block, object, library, routine, API, function, etc. Likewise, the same module may be instantiated by different applications, services, code blocks, objects, routines, APIs, functions, etc. The term "module" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A user interface system for navigating a hierarchy of visual elements, the hierarchy comprising a two-dimensional plane containing the visual elements and including a first axis and a second axis orthogonal to the first axis, the user interface system comprising:
   a display device operatively connected to a computing device, the display device including a gaze tracking system and a display system for presenting one or more of the visual elements; and
   a navigation module executed by a processor of the computing device, the navigation module configured to:
      establish a home location within a viewable region of the display device;
      establish a proportional size relationship between each of the visual elements and each of the other visual elements in the plane;
      receive gaze tracking data from the gaze tracking system;
      using the gaze tracking data, determine a gaze location at which a user is gazing within the viewable region of the display device;
      map the gaze location to a target location in the plane, wherein the target location is spaced from the home location along the first axis;
      initiate movement of the target location toward the home location, wherein the movement comprises a first component along the first axis; and
      as the target location moves closer to the home location, progressively enlarge each of the visual elements that are viewable within the viewable region while also maintaining the proportional size relationship between each of the visual elements and each of the other visual elements.

2. The user interface system of claim 1, wherein the navigation module is further configured to progressively enlarge each of the visual elements that are viewable within the viewable region while also maintaining the proportional size relationship between each of the visual elements and each of the other visual elements as the target location moves closer to the home location in a first direction along the first axis.

3. The user interface system of claim 2, wherein the navigation module is further configured to progressively shrink each of the visual elements that are viewable within the viewable region while also maintaining the proportional size relationship between each of the visual elements and each of the other visual elements as the target location moves closer to the home location in a second direction opposite to the first direction along the first axis.

4. The user interface system of claim 1, wherein the navigation module is further configured to refrain from initiating movement of the target location toward the home location when the target location lies within a pause region surrounding the home location.

5. The user interface system of claim 1, wherein the navigation module is further configured to proportionally decrease a velocity of the movement of the target location toward the home location as a distance of the target location from the home location decreases.

6. The user interface system of claim 1, wherein the target location is also spaced from the home location along the second axis, the movement further comprises a second component along the second axis, and the navigation module is further configured to refrain from modifying the visual elements that are viewable via the display in relation to the vertical component of the movement of the target location.

7. The user interface system of claim 1, wherein the visual elements include one or more apex elements and a plurality of subordinate elements that are subordinate to the one or more apex elements, and wherein each of the subordinate elements is directly subordinate to no more than one other element of the visual elements.

8. The user interface system of claim 1, wherein the display device is configured to receive a user input, and the navigation module is further configured to, based on the user input, select one of the visual elements that is associated with the target location.

9. The user interface system of claim 8, wherein the navigation module is further configured to select the one of the visual elements that is associated with the target location based on the user input when the target location lies within a pause region surrounding the home location.

10. A method for navigating a hierarchy of visual elements, the hierarchy comprising a two-dimensional plane including a first axis and a second axis orthogonal to the first axis, the method comprising:
   presenting one or more of the visual elements via a display system of a display device that is operatively connected to a computing device, the display device including a gaze tracking system;
   establishing a home location within a viewable region of the display device;
   establishing a proportional size relationship between each of the visual elements and each of the other visual elements in the plane;
   receiving gaze tracking data from the gaze tracking system;
   using the gaze tracking data, determining a gaze location at which a user is gazing within the viewable region;
   mapping the gaze location to a target location in the plane, wherein the target location is spaced from the home location along the first axis;
   initiating movement of the target location toward the home location, wherein the movement comprises a first component along the first axis; and
      as the target location moves closer to the home location along the first axis, progressively enlarging each of the visual elements that are viewable within the viewable region while also maintaining the proportional size relationship between each of the visual elements and each of the other visual elements.

11. The method of claim 10, further comprising progressively enlarging each of the visual elements that are viewable within the viewable region while also maintaining the proportional size relationship between each of the visual elements and each of the other visual elements as the target location moves closer to the home location in a first direction along the first axis.

12. The method of claim 11, further comprising progressively shrinking each of the visual elements that are viewable within the viewable region while also maintaining the proportional size relationship between each of the visual elements and each of the other visual elements as the target location moves closer to the home location in a second direction opposite to the first direction along the first axis.

13. The method of claim 10, further comprising refraining from initiating movement of the target location toward the home location when the target location lies within a pause region surrounding the home location.

14. The method of claim 10, further comprising proportionally decreasing a velocity of the movement of the target location toward the home location as a distance of the target location from the home location decreases.

15. The method of claim 10, wherein the target location is also spaced from the home location along the second axis, the movement further comprises a second component along the second axis, and the method further comprises refraining from modifying the visual elements that are viewable via the display in relation to the second component of the movement of the target location.

16. The method of claim 10, wherein the visual elements include one or more apex elements and a plurality of subordinate elements that are subordinate to the one or more apex elements, and wherein each of the subordinate elements is directly subordinate to no more than one other element of the visual elements.

17. The method of claim 10, further comprising:
   receiving a user input; and
   based on the user input, selecting one of the visual elements that is associated with the target location.

18. The method of claim 17, further comprising selecting the one of the visual elements that is associated with the target location based on the user input when the target location lies within a pause region surrounding the home location.

19. A method for navigating a hierarchy of visual elements, the hierarchy comprising a two-dimensional plane including a horizontal axis and a vertical axis, the method comprising:
   presenting one or more of the visual elements via a display system of a display device that is operatively connected to a computing device, the display device including a gaze tracking system;
   establishing a home location within a viewable region of the display device;
   establishing a proportional size relationship between each of the visual elements and each of the other visual elements in the plane;
   receiving gaze tracking data from the gaze tracking system;
   using the gaze tracking data, determining a gaze location at which the user is gazing within the viewable region;
   mapping the gaze location to a target location in the plane, wherein the target location is spaced from the home location along the horizontal axis and the vertical axis;
      initiating movement of the target location toward the home location, wherein the movement comprises a horizontal component along the horizontal axis and a vertical component along the vertical axis;
      as the target location moves closer to the home location along the horizontal axis, progressively enlarging each of the visual elements that are viewable within the viewable region in relation to the horizontal component of the movement while also maintaining the proportional size relationship between each of the visual elements and each of the other visual elements; and
   as the target location moves closer to the home location along the vertical axis, refraining from modifying the visual elements that are viewable via the display in relation to the vertical component of the movement of the target location.

20. The method of claim 19, further comprising refraining from initiating movement of the target location toward the home location when the target location lies within a pause region surrounding the home location.

* * * * *